United States Patent Office 2,888,300
Patented May 26, 1959

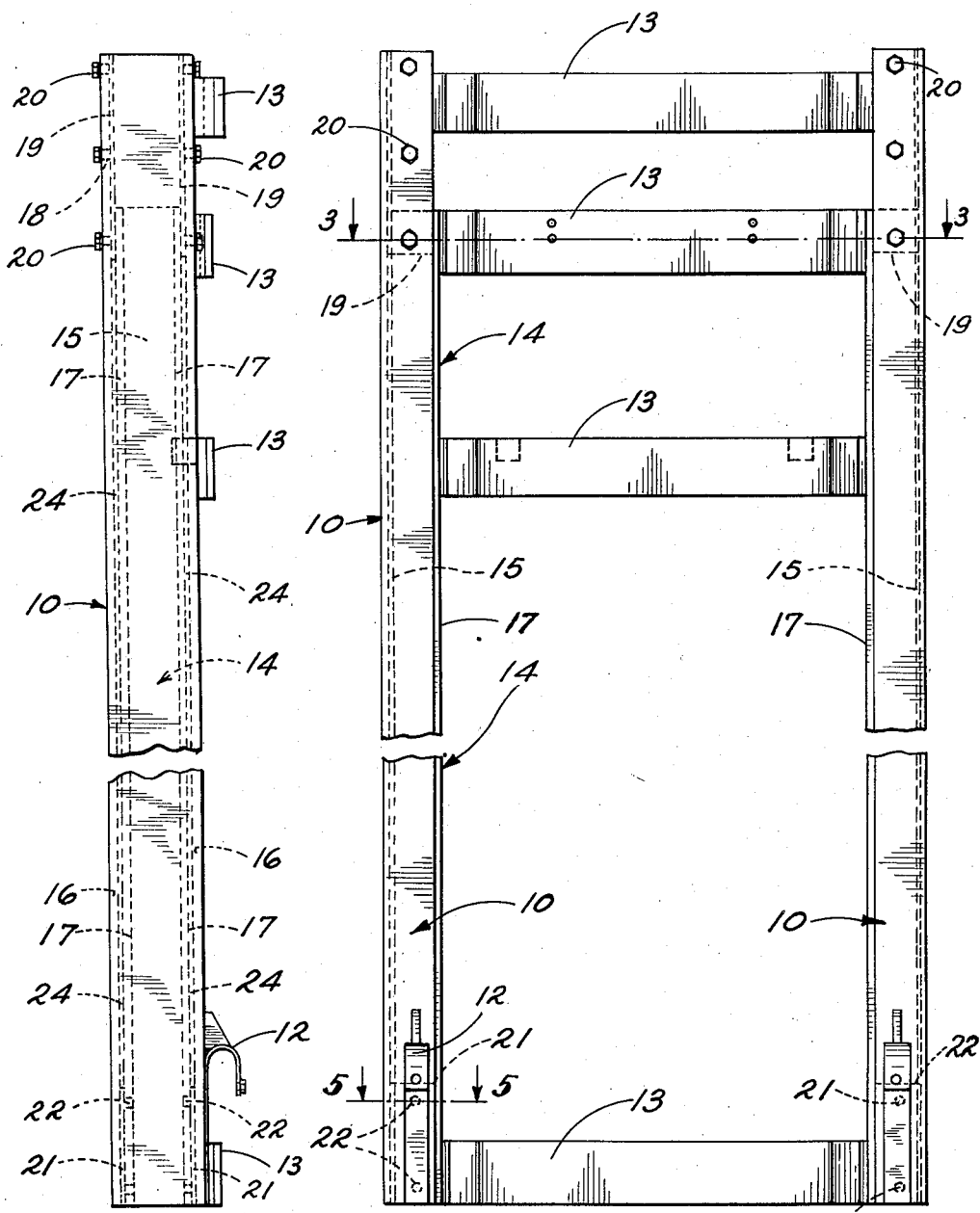

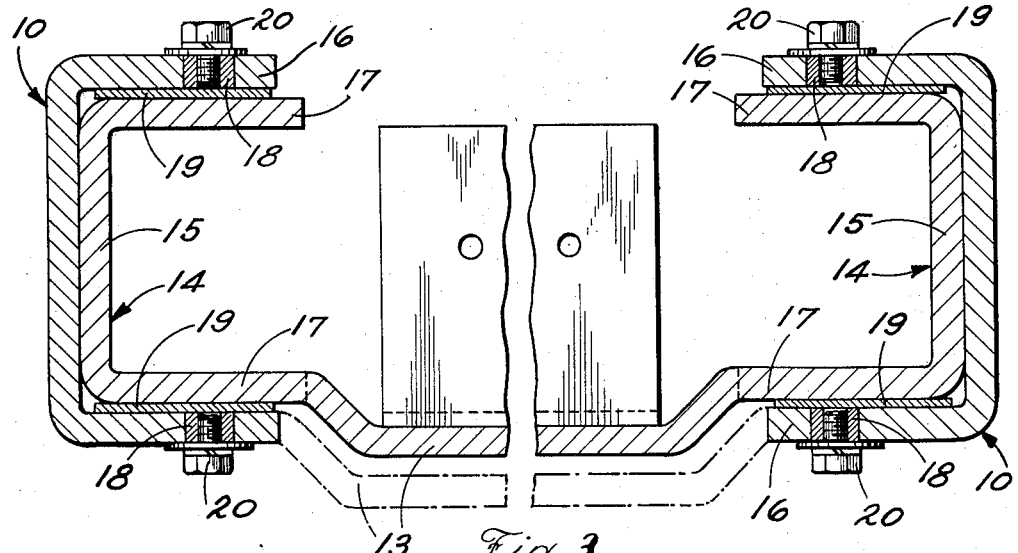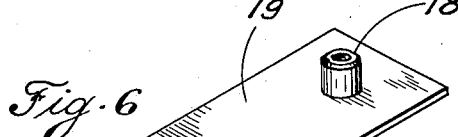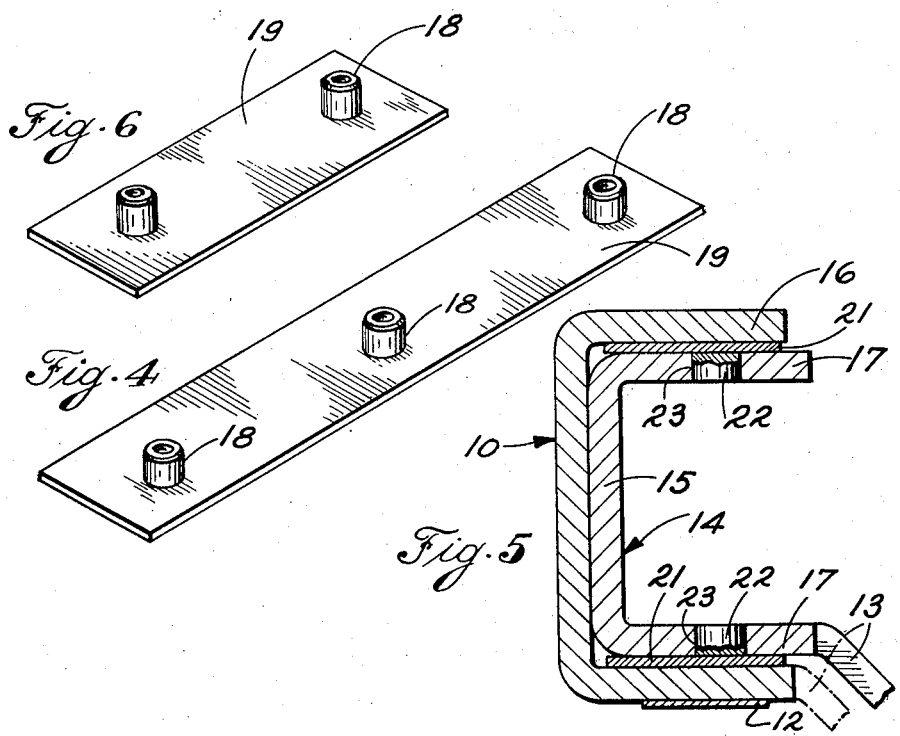

2,888,300

WEAR PLATES FOR MAST ASSEMBLY

Everett C. Curtis and John T. Crawford, Cleveland, Ohio, assignors to Towmotor Corporation, Cleveland, Ohio, a corporation of Ohio Application September 29, 1953, Serial No. 383,004

1 Claim. (Cl. 308—3)

This invention relates broadly to masts for lift trucks and more specifically to improvements in wear plates for slides of the type that are mounted for telescopic movement therein.

One of the objects of the invention resides in the provision of a wear plate or shoe which is designed to facilitate the ready attachment and removal thereof in a mast slide assembly.

Another object of the invention is to provide an organization of wear plates which are constructed to minimize the bearing surfaces without sacrifice to the stability of the slide supported thereby.

Another object of the invention is to provide a supporting structure for the shoes which is capable of resisting the thrust imposed thereon without modification of the structural members of the mast assembly.

Another object of the invention is to provide a pair of wear plates which are designed to accommodate the interchangeable assembly and reversal thereof as the end portions of the plates become worn.

Further objects of the invention reside in the provision of wear plates which are economic of manufacture, susceptible of ready installation and maintenance, efficient of operation, and substantially lighter in weight than the wear parts heretofore in use.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 1 is a front elevational view of a mast and slide assembly illustrating the improved wear plates in place therein.

Fig. 2 is a side elevational view thereof.

Fig. 3 is a transverse sectional view of the mast, the section being taken on a plane indicated by the line 3—3 in Fig. 1, and Fig. 4 is a view in perspective of one of the improved wear plates.

Fig. 5 is a transverse sectional view of a fragmentary portion of the mast slide assembly, the section being taken on a plane indicated by the line 5—5 in Fig. 1.

Fig. 6 is a view in perspective of an alternate form of the improved wear plates.

Referring first to Fig. 1 the mast, which is of a type extensively used in lift trucks, comprises a pair of spaced channel irons 10 disposed with the flanged portions thereof in confronting relation and provided with pivotal supporting brackets 12 adjacent the lower ends thereof. The channels 10 are united by cross members 13 welded to the flanges on the rearward face thereof and spaced therefrom to provide a running clearance for the ram cross head, not shown. The slide comprises a rectangular frame 14 embodying channel iron side rails 15 disposed between the flanges 16 of the mast and arranged with the flanged portions 17 thereof in spaced parallel relation with like parts of the mast. The upper ends of the mast channels are drilled for the reception of dowels or bosses 18 affixed upon the outer faces of the wear plates 19 which are formed of graphite bronze or other suitable bearing material and disposed between the flanges of the channels 16 and 17. The bosses are drilled and tapped for the reception of cap screws 20 which are mounted therein with the headed portions thereof engaged with the outer faces of the webs of the channels 10. The wear plates are approximately ⅛ the length of the slide and the thickness thereof is approximately ½ of an inch.

The wear plates 21 for the lower end of the mast assembly are restrained against axial movement by dowels 22 mounted on the inner faces of the plates and engaged in openings 23 in the slide channels 15. The lower wear plates are assembled or dismantled by running the slide down beyond the lower ends of the mast channels 10 and inserting the dowel portions thereof through the openings 23 in the slides.

The slide frame 14 is formed to facilitate the free running movement thereof over the contiguous faces of the upper wear plates 19 and to accommodate like movement of the outer faces of the lower plates with the channels 10. The length of the plates 21 are preferably shorter than the length of the plates 19 though they may be of identical form in the interest of interchangeability.

It will be recognized that the improved shoes or wear plates materially reduce the frictional resistance offered by the slide which heretofore extended throughout the length of the mast channels; that the shoes of the present invention may be more readily replaced than those formerly in use, that the upper plates may be exchanged and turned end for end as wear occurs; that the void 24 between the ends of the shoes serves as a reservoir for packing grease, and that the structure in its entirety is more economical of manufacture and assembly than the permanently mounted continuous wear strip heretofore in use.

As illustrated in Fig. 6, the wear plate 19 is formed with the dowels 18 disposed in equi-spaced relation from its ends in the medial axis of the plate, the center to center distance between the dowels being the same as that of the drilled openings in the flanged portions of the mast and slide. With this construction the wear plates may be interchangeably assembled on either side or end of either channel member.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

A mast and slide assembly for a lift truck comprising a mast having a pair of spaced vertically disposed U-shaped channels adapted to be secured to the lift truck, said mast channels arranged with the open sides thereof facing each other, a slide arranged within the mast channels, said slide comprising a pair of spaced vertically disposed U-shaped channels telescopically arranged within the mast channels with the open sides thereof facing each other, a flat wear plate mounted on each of the side walls of the mast channels at the upper end thereof, a flat wear plate mounted on each of the side walls of the slide channels at the lower end thereof, said wear plates being of the same thickness and having spaced mounting bosses projecting from the back face of the wear plate, the mast channel and the slide channel having corresponding spaced openings to receive the spaced mounting bosses on the wear plates whereby each of the wear plates may be inverted after being worn at one end and the slide thereby restored to parallelism with the mast.

References Cited in the file of this patent

UNITED STATES PATENTS

| | | |
|---|---|---|
| 1,789,714 | Short | Jan. 20, 1931 |
| 1,803,749 | Demarest | May 5, 1931 |
| 1,817,684 | Giustiniani | Aug. 4, 1931 |
| 2,053,990 | Goodwin | Sept. 8, 1936 |
| 2,456,320 | Repke | Dec. 14, 1948 |
| 2,595,959 | Lawless | May 6, 1952 |
| 2,632,530 | Wagner | Mar. 24, 1953 |
| 2,685,483 | Morra | Aug. 3, 1954 |